(12) United States Patent
Darby

(10) Patent No.: US 6,640,969 B2
(45) Date of Patent: Nov. 4, 2003

(54) DECORATIVE DISC HOLDER

(76) Inventor: David A. Darby, 629 Pinnacle Ct., Mesquite, NV (US) 89027

( * ) Notice: Subject to any disclaimer, the term of this patent is extended or adjusted under 35 U.S.C. 154(b) by 106 days.

(21) Appl. No.: 09/947,123

(22) Filed: Sep. 5, 2001

(65) Prior Publication Data

US 2003/0042155 A1 Mar. 6, 2003

(51) Int. Cl.⁷ ............................................... B65D 85/57
(52) U.S. Cl. .................... 206/308.1; 206/477; 206/495; 248/205.2; 40/340; 211/40
(58) Field of Search ................. 206/308.1, 308.3, 206/309–313, 493, 477, 495; 248/690–692, 205.2; 40/340; 211/40, 41.12

(56) References Cited

U.S. PATENT DOCUMENTS

| | | | |
|---|---|---|---|
| 3,027,012 A | * 3/1962 | Talmadge | 211/40 |
| 4,940,147 A | * 7/1990 | Hunt | 211/40 |
| 4,951,826 A | * 8/1990 | Tompkins | 211/40 |
| 5,040,687 A | * 8/1991 | Whittington | 211/40 |
| 5,072,836 A | 12/1991 | Gross | |
| 5,407,067 A | 4/1995 | Cotter et al. | |
| 5,429,335 A | * 7/1995 | Cunningham | 248/229.1 |
| 5,570,791 A | * 11/1996 | Sommi | 211/40 |
| 5,609,258 A | * 3/1997 | Spector | 211/40 |
| 5,715,937 A | 2/1998 | Oshry et al. | |
| 6,123,191 A | * 9/2000 | Dean | 206/310 |
| D431,956 S | 10/2000 | Chouraqui et al. | |
| 6,161,693 A | 12/2000 | Findle et al. | |
| 6,164,445 A | 12/2000 | Cooper | |
| 6,179,119 B1 | 1/2001 | Manoogian | |
| 6,186,321 B1 | 2/2001 | Eskandry | |
| 6,186,332 B1 | * 2/2001 | Combs | 206/759 |
| 6,188,032 B1 | 2/2001 | Hartman | |
| 6,196,384 B1 | 3/2001 | Belden, Jr. | |
| 6,196,510 B1 | 3/2001 | Legaspi | |
| 6,196,647 B1 | 3/2001 | Kupferschmid | |
| 6,202,839 B1 | 3/2001 | Petersen et al. | |
| 6,203,129 B1 | 3/2001 | Kupferschmid | |
| 6,213,312 B1 | 4/2001 | Thielsen | |
| 6,216,863 B1 | 4/2001 | Williamson et al. | |

* cited by examiner

Primary Examiner—J. Mohandesi
(74) Attorney, Agent, or Firm—Jones, Waldo, Holbrook & McDonough; Brent T. Winder

(57) ABSTRACT

A decorative disc holder is provided. The disc holder includes a display member and a disc securing mechanism, removably attached to the display member. In one embodiment, the display member is fabric. An example of a suitable fabric is a loop fabric. In one embodiment, the disc securing mechanism includes a hub having a front side and a back side and a hook fastener attached to the back side of the hub.

8 Claims, 3 Drawing Sheets

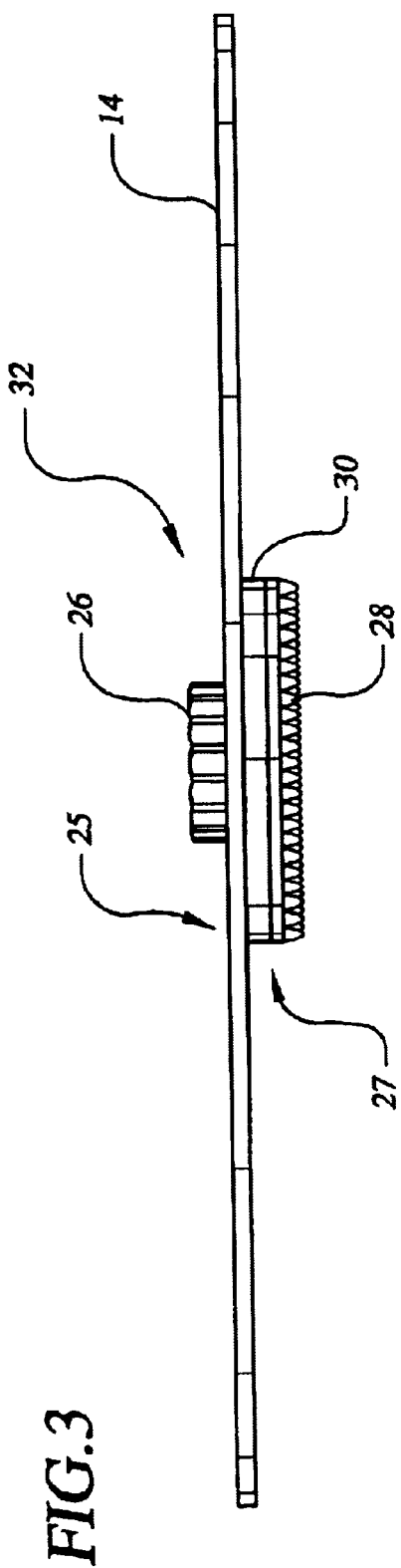
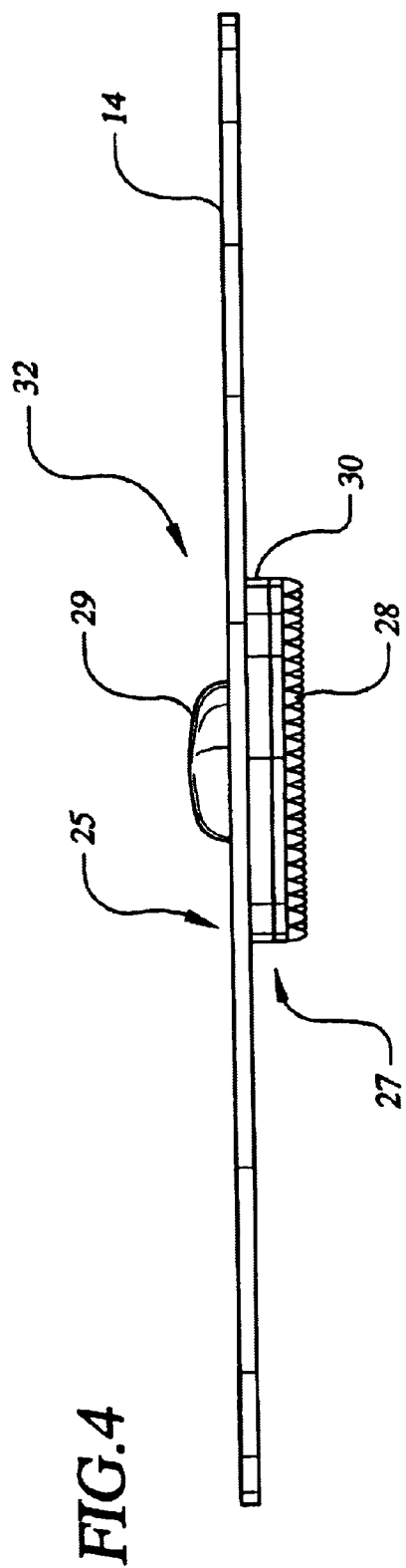

DECORATIVE DISC HOLDER

FIELD OF THE INVENTION

The present invention relates to a disc holder, and more particularly to a disc holder that is space-efficient, and allows reconfiguration of the disc display to accommodate occasion and taste.

BACKGROUND OF THE INVENTION

Discs are a widely used storage medium for music, software, movies and computer games. Various display and storage devices for discs have been conceived. For example, a common disc storing device is a jewel box. A jewel box is typically a three-piece, molded plastic box having a transparent base, a transparent lid attached to the base with a hinge, and a disc-holding tray secured on the base. The disc is removably secured onto the tray by a centrally located circular array of flexible teeth or bubble on the tray, generally referred to as a hub, that engages the center hole edge of the disc. Jewel boxes are mainly designed as a protective storage device, and are not well suited for decoratively displaying a disc collection.

Other disc display devices known in the prior art are outlined below. Each of these references is incorporate by reference for its supporting teachings.

U.S. Pat. No. 6,164,445 to Cooper discloses a compact disc display device having a display member, and a base member. The display member forms upwardly adjacent from the base member where the base member rests on any horizontal surface. A compact disc securing means is attached to the display member that releasably secures to a center hole in the compact disc.

U.S. Pat. No. 5,072,836 to Gross discloses a wall mountable storage rack for compact disks comprising an open framework forming a plurality of adjacent rectangular receptacles, each being sized to accept a compact disk when the disk is oriented with one of the disk's largest surfaces facing outward of the rack. At least one releasable latch is integrated into each of the receptacles for releasably retaining a disk therein. Each of the rectangular receptacles is formed from four elongated side members releasably joined to four corner members. Preselected ones of the corner members are connectable to other elongated side members for forming the adjacent receptacles. The corner members also include a pin and socket arrangement on a rear surface for attaching a backing to an assembled rack. The rack may be wall mounted using VELCRO type fasteners or the corner members may include pin holes formed therethrough for attaching the rack to a wall with small brads or pins.

U.S. Pat. No. 6,216,863 to Williamson, et al. discloses a container with double-walled construction which eliminates problems encountered with a conventional jewel box. The container comprises a rectangular shell and a cartridge non-removably held within the shell. The cartridge in turn holds a disc. The disc is ejectable from one side with an ejection button and the cartridge is sheathed in the shell so as to have only one open side. The container allows printed material to completely obscure a disc held within the cartridge, yet the container allows one to determine visually whether a disc is stored within the cartridge from the position of the ejection button. The roof of the cartridge is provided with a detent in which the central aperture of the disc is held, and while so held, the disc is supported in the cartridge only at its opposed peripheral edges.

U.S. Pat. No. 6,213,312 to Thielsen discloses a compact disk (CD) storage system wherein the disks are stored and filed in transparent plastic pouches mounted on carrier plates. The carrier plates are formed with a pair of slots for slidably and removably hanging each carrier plate on a pair of parallel guide rails supported by a cabinet or a stand. The pouches may be replaced by hubs mounted centrally on the carrier plates for frictionally receiving and retaining the central circular opening of a CD. The slots may be keyhole-shaped with entrance portions having an interference fit with the rails. Alternatively, the slots may be L-shaped for hooking the carriers on the rails. Each plate may have a second transparent pouch on the opposite side of the plate for receiving a label. Similar index plates may have index tabs thereon. Other plates may have CD OUT thereon. The cabinet for supporting the rails may be generally rectangular and may support the rails either horizontally or vertically. Alternatively, the rails may be circular and supported horizontally on a vertical stand which may rotatably support the rails. Instead of being plate-like carriers, each carrier may have a housing with a rectangular cavity therein for snugly receiving a box for a CD.

U.S. Pat. No. 6,203,129 to Kupferschmid discloses an improved carrier having laterally and inwardly extending tabs from the top of each side wall of the carrier for use in a storage system that facilitates the adjustment and rearrangement of vertically-stacked components.

U.S. Pat. No. 6,202,839 to Petersen et al. discloses a portfolio including a sheet-like body having first and second spaced hinge lines dividing the sheet-like body into a first end section, a middle section, and a second end section each having respective front and rear surfaces. The first and second end sections are foldable between a closed position, wherein the second end section is disposed intermediate the first end section and the middle section, and an open position, wherein all three sections are in common alignment in a generally flat configuration. First compact disc-receiving pockets are disposed on the front surface of the second end section and open toward the first and second hinge lines when the portfolio is in the open position. Each first disc-receiving pocket completely encloses a respective compact disc inserted therein. Second disc-receiving pockets are disposed on the rear surface of the second end section and open away from the first hinge line when the first end section is folded towards the middle section. Each of the second disc-receiving pockets substantially enclose a respective compact disc inserted therein, with the first end section covering the exposed portion of the disc when the portfolio is in the folded configuration. Each of the disc-receiving pockets is preferably transparent and is in sealed connection with the second end section along three of its four edges. The portfolio further includes plural sheets with card-receiving pockets which are securely connected to the sheet-like body along the first hinge line.

U.S. Pat. No. 6,196,647 to Kupferschmid discloses a storage system that facilitates the adjustment and rearrangement of vertically-stacked components. The system comprises two oppositely-faced panels and a plurality of carriers having opposing side walls and a rear wall to provide a cavity for holding a unit to be stored. The carriers are stacked between the oppositely-faced panels in vertical array and are positioned relative to the oppositely-faced panels such that the carriers may be sidably moved in a vertical direction relative to the panels. However, the carriers are positioned against removal from between the panels through the combination of a protuberance and recess interlock between the panels and each carrier. The protuberance is retractable from the recess to allow entry and egress of each carrier from the panels.

U.S. Pat. No. 6,196,510 to Legaspi discloses a bracket for supporting CD cases onto a planar mounting surface so that the front of the case is visible. The bracket is comprised of a planar, which has a rigid portion, a flexible portion, a first side which faces the mounting surface, and a second side which faces away from the mounting surface. Four rigid arms are attached to the first side and are positioned to hold the case when the case is engaged into the bracket. Two rigid base pieces function as offsetting means, to offset the bracket from the mounting surface. Two tabs for holding the case by two holes on the case are attached to two of the arms. The remaining two arms do not have tabs, and one of these arms is attached to the flexible portion of the planar. Case insertion into the bracket and extraction from the bracket is made possible by the interaction of the offsetting means, the flexible portion, and the arm with no tabs. Both insertion and extraction do not require any forces pulling the bracket away from the mounting surface. Instead, case insertion and extraction is executed by pushing an arm elastically toward the mounting surface, eliminating the risk of inadvertently separating the bracket from the mounting surface or damaging the mounting surface. The bracket inflicts zero clamping forces on the case, eliminating the risk of damaging the case.

U.S. Pat. No. 6,196,384 to Belden, Jr. discloses a storage container for holding an item of recorded media. The container includes a base and an outer wall extending upwardly from the base. The outer wall has an upper surface adapted to receive the lower surface of the item adjacent the outer diameter of the item. The storage container also includes a retaining hub that extends upwardly from the base. The retaining hub includes a plurality of hinged arms and fixed supports. A retaining lip is carried by the hinged arms. The retaining lip engages the upper surface of the item in a storage position and is moveable inwardly and downwardly to release the item. Retaining lip also engages the lower surface of the item to lift the item from the storage container. The fixed supports include an upper surface that remains in position during the removal of the item to provide support to the item to substantially prevent bending forces from damaging the item.

U.S. Pat. No. 6,188,032 to Hartman discloses a stacking, self-cleaning CD holder assembly. The assembly includes a plurality of CDs and CD booklet receptacles which are flattened and square in shape and a plurality of sets of corner connectors which connect to the receptacles and connect among the connectors. The receptacles have mitered corners with receptacle tongues extending therealong. The connectors have respective receptacle grooves, connector tongues, and connector grooves formed therein and thereon. The corner connectors releasably attach to the corners of a receptacle by engagement of the receptacle tongue and groove and releasably connect to corner connectors of other receptacles by engagement of the respective connector tongues and grooves. The receptacles have internal walls shaped to conform to a compact disc or a booklet from a CD package. The CD receptacles have cleaning pads positioned therein for engagement by a CD when inserted into or withdrawn from a CD receptacle.

U.S. Pat. No. 6,186,332 to Combs discloses a compact disc (CD) and booklet display stand that enables a plurality of such CDs and booklets to be stored for convenient access, such as in a desktop environment. The display stand mounts a plurality of CD/booklet holders to a stand that places the holders for convenient access by a user. Some embodiments of the display stand may be folded for secure transportation or storage.

U.S. Pat. No. 6,179,119 to Manoogian discloses a container for holding storage media which contains an image carrying member, an upper and lower case member and a storage media holding member.

U.S. Pat. No. 6,161,693 to Findle, et al. discloses a reusable package for displaying and storing a display item, such as a cutting blade. The package includes front and rear body portions hingedly interconnected with each other. Closure portions are formed in the front and rear body portions and are mutually engageable in a gripping and releasable relationship through a central aperture on the display item when the body portions are in their closed position. At least one of the body portions includes an anti-rotation lug that is engageable with a surface discontinuity on the display item, such as a space between adjacent teeth on a cutting blade, thus preventing the display item from rotating when the package is closed.

While the foregoing prior art references demonstrate improvement in the field of disc display, none of these references teach a display system that allows a user to reconfigure the arrangement of the discs on display. The ability to reconfigure the arrangement of discs on display would be advantageous because it would allow the user to adapt the display according to occasion and taste.

Furthermore, the typical workspace around a computer is equipped with hardware such as monitors, printers, keyboards, speakers, etc. This hardware takes up a significant portion of the available workspace. Accordingly, a user is restricted in the number of discs that can be stored near the computer workstation. Jewel boxes are bulky and unstable when stacked, and simply stacking the discs out of the containers is not a viable solution. Oils and dirt contacting the underside of a disc can render data impressed on a disc unreadable. Additionally, such lack of protection subjects the disc to significant risk of scratching.

Accordingly, a disc holder that is space-efficient, and allows reconfiguration of the disc display to accommodate occasion and taste, would be desirable.

SUMMARY OF THE INVENTION

A decorative disc holder is therefore provided. The disc holder includes a display member and a disc securing mechanism, removably attached to the display member. In one embodiment, the display member is fabric. An example of a suitable fabric is a loop fabric. In one embodiment, the disc securing mechanism includes a hub having a front side and a back side and a hook fastener attached to the back side of the hub.

The hook fastener can be adhesively attached to the back side of the hub. In one embodiment the hub includes a circular array of flexible teeth on its front side adapted to secure a disc. In another embodiment, the hub includes a bubble on its front side adapted to secure a disc.

A method of decoratively displaying a disc is also disclosed. This method includes as steps, securing a disc to a disc securing mechanism and removably attaching the disc securing mechanism to a display member.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 3 is a side view of a flexible teeth securing mechanism and disc.

FIG. 4 is a side view of a bubble securing mechanism and disc.

DETAILED DESCRIPTION OF THE PREFERRED EMBODIMENT(S)

To begin, it is noted that, as used herein, the term "disc" refers generally to any optically readable media encompassing any medium on which information may be optically read by a laser, including, but not limited to, data that represents audio, video, text, images, computer data or any combination thereof. However, it is also noted that virtually any disc shaped item could be stored and displayed with the present invention.

Figure 1:
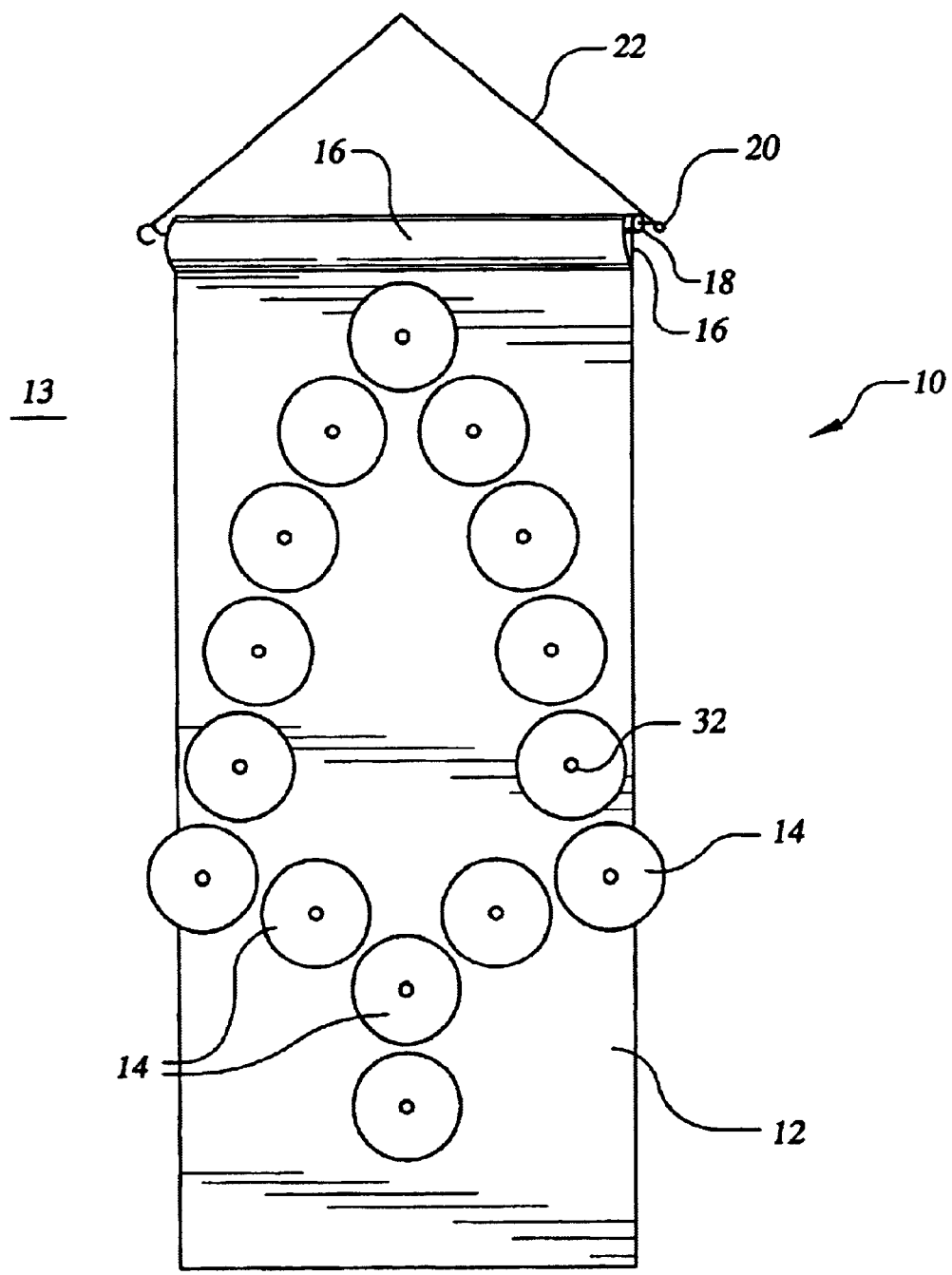
FIG. 1 is an embodiment of a disc holder according to the present invention.

In FIG. 1 is shown an embodiment of a disc holder 10 according to the present invention. The disc holder 10 includes one or more discs 14 that are each removably attached to a securing mechanism 32 that is removably mounted on a display member 12. The securing mechanism 32, can be removed from the display member 12, then reattached, thus enabling the discs 14 to be configured in a variety of ways. For example, in FIG. 1, the discs 14 are arranged in a Christmas tree pattern. Other similar disc configurations and designs can be selected depending on occasion and taste (e.g. heart shapes, crosses, etc.).

The display member 12 and attached discs 14 can then be hung from a wall, door, or similar surface 13. In one embodiment, a portion of the display member 12 is wrapped into a loop 16. Through this loop 16, a support member 18, such as a dowel, is inserted. A wall mounting device 22, such as cord or string, is attached to the support member 18 through a securing device 20, such as eye screws. The wall mounting device 22 secures the display member 12 to the desired surface 13.

As noted above, an advantage of the present invention is the user's ability to reconfigure the disc 14 arrangement. As seen in FIGS. 2(a) and (b), the discs 14 are removably attached to the display member 12 by a removable securing mechanism 32 (FIG. 3). FIGS. 2(a) and (b) show top and bottom views, respectively, of the securing mechanism 32 in combination with a disc 14.

Referring to FIGS. 2(a), 3 and 4, the disc securing mechanism 32 includes a hub 30 having a front side 25 and a back side 27. In one embodiment, the disc 14 is secured to the securing mechanism 32 trough the engagement of a circular array of flexible teeth 26 with the center hole 24 of the disc 14. However, it is noted that the disc 14 may be secured to the securing mechanism 32 through any device that removably engages the center hole 24 of the disc 14. This could be accomplished through a bubble 29 (shown in FIG. 4) on the front side 25 of the hub 30, or any similar means of engaging the center hole 24 of a disc 14 that would be apparent to one skilled in the art.

Figure 2B:
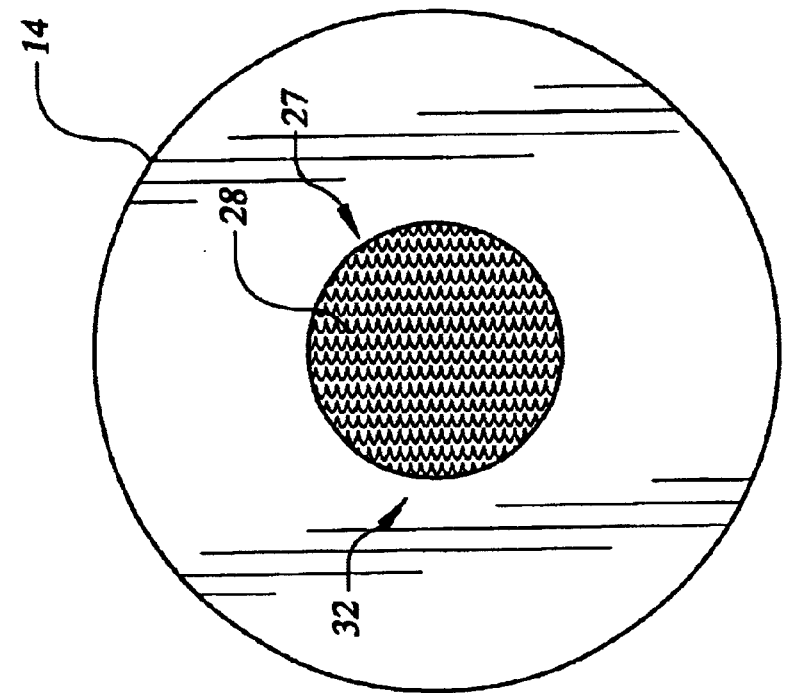
FIG. 2(b) is a bottom view of a securing mechanism and disc.
Figure 2A:
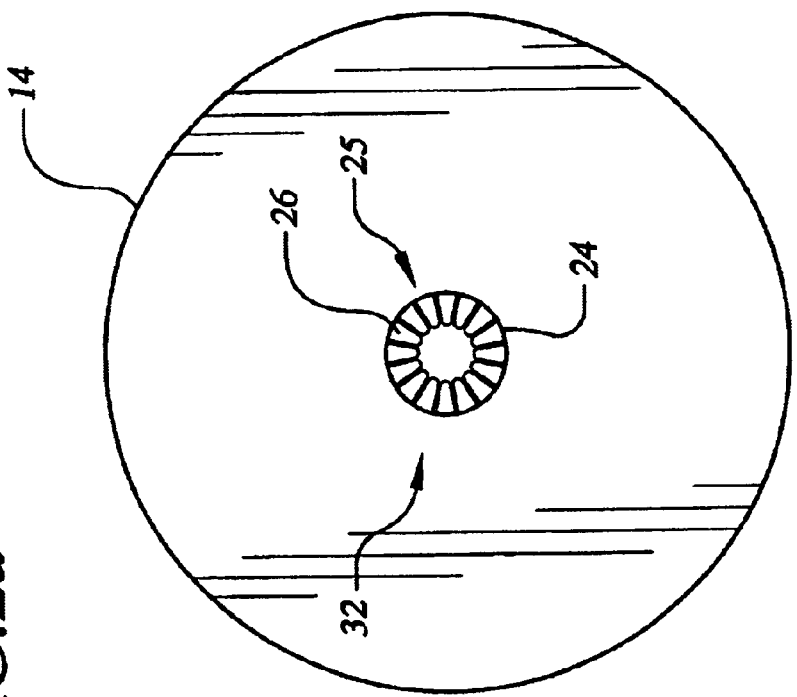
FIG. 2(a) is a top view of a securing mechanism and disc.

In FIGS. 2(b) and 3, a hook fastener 28 is shown attached to the back side 27 of the hub 30. In one embodiment, the hook fastener 28 is adhesively attached to the back side 27 of the hub 30. Examples of hook fasteners suitable for use with the present invention include, but are not limited to, Hook 88, Hook 65, Hook 805, Hook MVA #8, and Vel-Lok® available from Velcro USA, Inc. of Manchester, N.H. Numerous other brands and types of hook fasteners that could be used with the present invention would be apparent to one skilled in the art.

In operation, a user secures a disc 14 to the disc securing means 32, then places the combined disc 14 and securing mechanism 32 on the display member 12. The hook fasteners 28 attached to the securing mechanism 32 engage the fibers of the display member 12, thereby removably mounting the disc 14 on the display member 12. Additional discs 14 may also be placed on the display member 12 in whatever design is desired.

It is noted that the display member 12 can be made from any suitable material that will engage the hook fasteners 28 on the securing mechanism 32. Examples of suitable display member 12 materials include, but are not limited to, Veltex®, Loop 1000, Loop 2000, Loop 36 and Wide Loop 3001, all available from Velcro USA, Inc. of Manchester, N.H. The foregoing proprietary hook and loop fasteners are listed merely as examples, and are in no way intended to limit the present invention to any particular proprietary product.

It is also noted that the configuration of the discs 14 relative to the display member 12, as well as the soft grade of the display member 12, prevent oils and dirt from contacting the underside of the disc. As noted above, such oils and dirt can render data impressed on a disc unreadable. Moreover, the soft grade of the display member 12 also protects the discs from scratching when not in use.

It is further noted, that in addition to the aesthetic appeal and efficient use of space outlined above, an advantage of the present invention, is its compactness. If the disc holder is not in use, it may be rolled up and conveniently stored.

Further modifications of the present invention include a single support member 18/securing device 20 piece. For example, a single molded plastic piece could have securing devices 20 molded at either end of an elongated portion. Moreover, the support member and securing device piece could directly attach to the display member 12, thus the looping portion 16 of the display member 12 would not be required.

Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A decorative holder for one or more discs having a substantially central hole, comprising:
   a) a flexible display member made of loop fabric, the flexible member having a wall mounting device adapted to suspend the flexible display member from a location on a wall such that the flexible display member is below said location when suspended; and
   b) a disc securing mechanism, removably attached to the flexible display member, having:
      i) a hub, that engages the one or more discs through the central hole; and
      ii) a hook fastener attached to a back side of the hub that engages one or more loops on the flexible display member; wherein the disc securing mechanism in combination with the disc can be reconfigured on the display member.

2. The decorative disc holder of claim 1, wherein the hook fastener is adhesively attached to the back side of the hub.

3. The decorative disc holder of claim 1, wherein the hub engages the one or more discs by a circular array of flexible teeth, having a first diameter, and wherein the central hole has a second diameter that is exceeded by the first diameter.

4. The decorative disc holder of claim 1, wherein the hub engages the one or more discs by a bubble having a first diameter, and wherein the central hole has a second diameter that is exceeded by the first diameter.

5. A method for decoratively displaying one or more discs, having a substantially central hole, comprising the steps of:
   a) securing the one or more discs to a disc securing mechanism having:
      i) a hub, that engages the one or more discs through the central hole; and
      ii) a hook fastener attached to a back side of the hub;
   b) suspending a loop fabric flexible display member having a wall mounting device from a location on a wall such that the flexible display member is below said location when suspended; and
   c) removably attaching the disc securing mechanism to the flexible display member engaging the hook fastener; wherein the disc securing mechanism in combination with the disc can be reconfigured on the flexible display member.

6. The method of claim 5, wherein the hook fastener is adhesively attached to the back side of the hub.

7. The method of claim 5, wherein the hub engages the one or more discs by a circular array of flexible teeth, having a first diameter, and wherein the central hole has a second diameter that is exceeded by the first diameter.

8. The method of claim 5, wherein the hub engages the one or more discs by a bubble having a first diameter, and wherein the central hole has a second diameter that is exceeded by the first diameter.

* * * * *